Feb. 25, 1958 J. W. COLLINS ET AL 2,824,602
SEAT STRUCTURE
Filed May 10, 1956 2 Sheets-Sheet 1

INVENTORS
John W. Collins &
Donald W. Richards
BY
H H Oldham
ATTORNEY

Feb. 25, 1958  J. W. COLLINS ET AL  2,824,602
SEAT STRUCTURE
Filed May 10, 1956  2 Sheets-Sheet 2
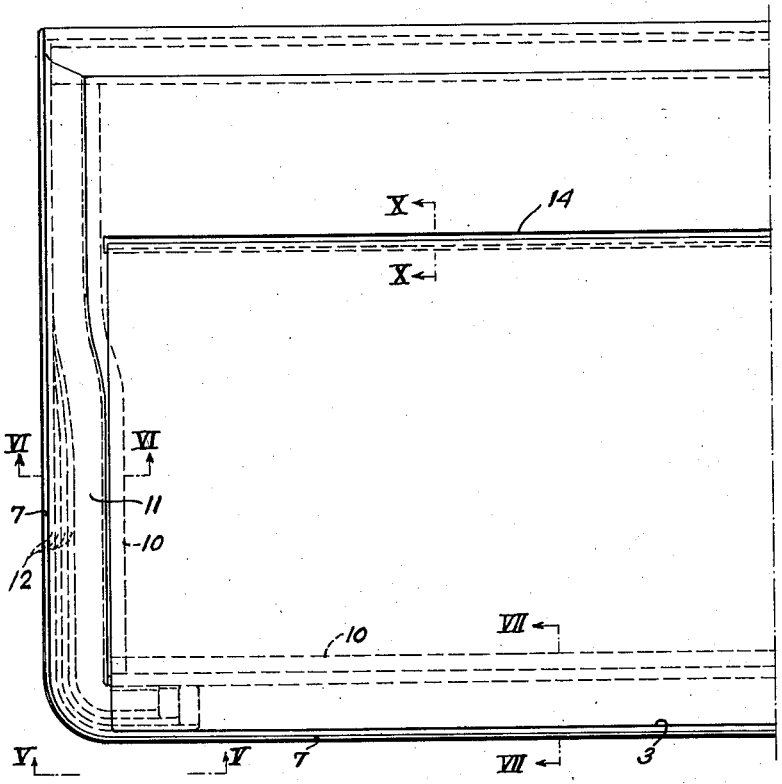
Fig. 4
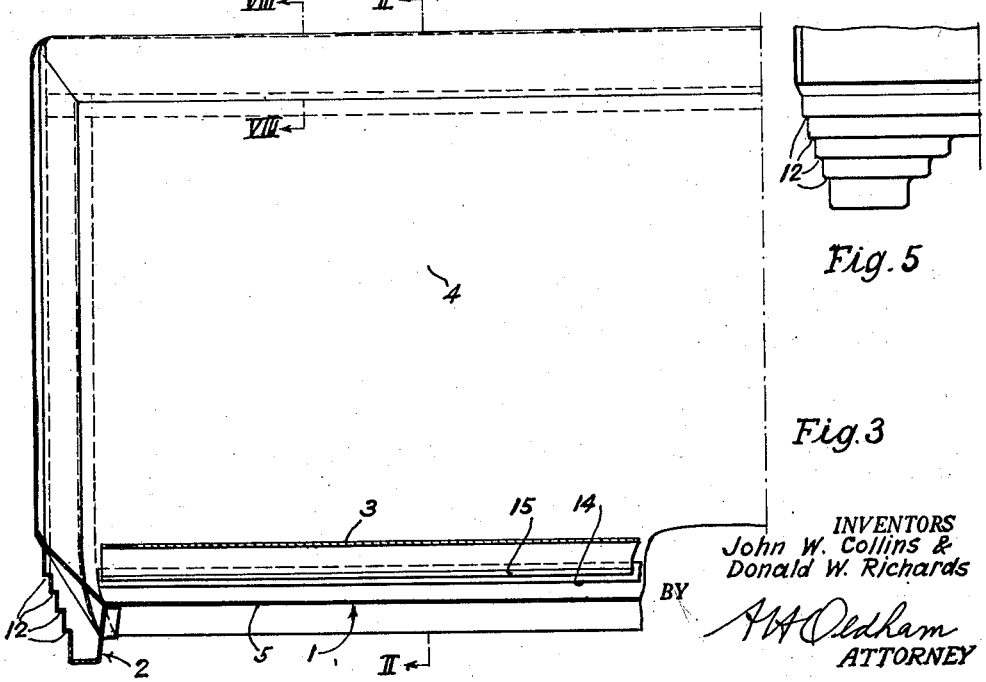
Fig. 5
Fig. 3
INVENTORS
John W. Collins &
Donald W. Richards
BY
*H H Oldham*
ATTORNEY

United States Patent Office 2,824,602
Patented Feb. 25, 1958.

2,824,602

SEAT STRUCTURE

John W. Collins, Cuyahoga Falls, and Donald W. Richards, Akron, Ohio, assignors to Goodyear Aircraft Corporation, Akron, Ohio, a corporation of Delaware Application May 10, 1956, Serial No. 584,132

7 Claims. (Cl. 155—191)

This invention relates generally to a seat frame structure and more particularly to a seat frame for seats whereon upholstering and cushioning may be added to form a completely finished seat.

The general object of the invention is to provide a seat frame structure formed of molded reinforced plastic components which inherently possess high strength, lighter weight and excellent impact resistance.

Another object of the invention is to provide a seat frame structure that has a minimum number of component parts resulting in decreased tooling costs and assembly time.

A further object of the invention is to provide a seat frame structure of which portions are shaped in patterned configurations visible in the complete unit to effect seat styling.

A yet further object of this invention is to provide a seat frame structure having a closed box section around the periphery thereof formed economically and efficiently from either a one or two part construction.

Other objects and advantages of this invention will become apparent hereinafter as the description thereof proceeds; the novel features, arrangements and combinations being clearly delineated in the specification as well as in the claims thereunto appended.

In the drawings:

Fig. 3 is a partial cross-sectional view taken along line III—III of Fig. 2;

Fig. 4 is a partial top plan view of the seat of Fig. 1;

Fig. 5 is a fragmentary front elevational view taken along line V—V of Fig. 4;

Figure 1:
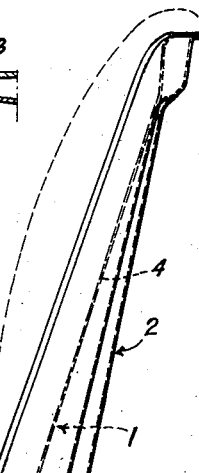
Fig. 1 is a side elevation of the seat frame structure of the invention.
Figure 2:
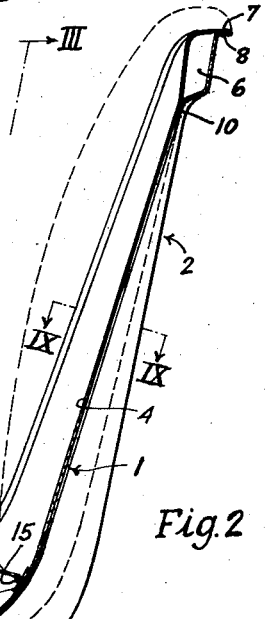
Fig. 2 is a cross-sectional view taken along line II—II of Fig. 3.

Referring to Figs. 1 and 2, the seat frame structure of the invention is shown constructed of three molded parts formed of reinforced plastic; namely, a shaped diaphragm 1, a supporting frame 2 therefor, and a diaphragm 3 overlying a portion of the diaphragm 1.

Figure 6:
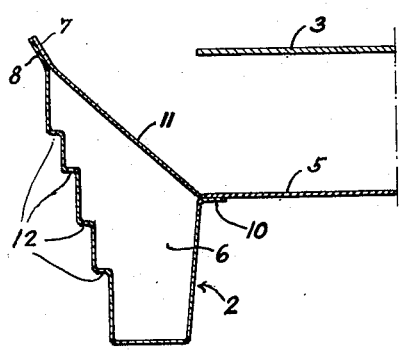
Fig. 6 is a fragmentary cross-sectional view taken along line VI—VI of Fig. 4.

The diaphragm 1 has a generally vertical upper portion 4 forming the seat frame back and a concave upwardly curved lower portion 5 forming the seat frame bottom. The supporting frame 2 is molded so as to form closed box sections 6, such as are shown in Fig. 6, when the diaphragm 1 is properly positioned with respect to the frame 2. As will appear more clearly as the description proceeds, the box section 6 is present around the entire periphery of the diaphragm 1 and provides not only a reinforcement therefor but also serves as the foundation for the entire seat and with portions thereof providing configured styling for the seat after upholstering and cushioning.

Figs. 3 and 4 are partial elevational and plan views of the seat of Fig. 1. Beginning at the front bottom portion of the seat, Fig. 7, taken along line VII—VII of Fig. 4, shows in enlarged detail the construction of the box section 6 at this point. The lower portion 5 of the diaphragm 1 is formed with an upwardly slanted flange 7 to overlie a similar flange 8 on the frame 2. The frame 2 has an offset 9 and is generally U-shaped with a second flange 10 meeting the lower portion 5 of the diaphragm 1. The two flanges 8 and 10 are suitably attached to portions 7 and 5 by any of the methods well known in the art of joining reinforced plastics.

Figure 7:
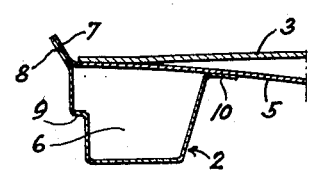
Fig. 7 is a fragmentary cross-sectional view taken along line VII—VII of Fig. 4.

Fig. 6 is a fragmentary cross-sectional view taken along the line VI—VI of Fig. 4 and shows the construction of the box section 6 at this point. The flange 7 on the diaphragm lower portion 5 previously shown in Fig. 7, now appears at the end of an upwardly slanted portion 11 of the diaphragm lower portion 5 to form the upper surface of the box section 6. The flanges 8 and 10, previously described in connection with Fig. 7, are shown respectively overlying the flange 7 and the diaphragm lower portion 5 and are affixed thereto. Referring now to Fig. 4 it can be seen that the flanges 7, 8 and 10 are continuous from line VII—VII, around the lower seat corner, and to line VI—VI. As will be seen as the description proceeds, the flange 7 is a continuous shaped flange around the entire periphery of the diaphragm 1, and the flange 8 a continuous matching flange around the entire periphery of the frame 2. On the inner wall of the frame 2, flange 10 is a continuous flange around the entire periphery thereof.

Figure 8:
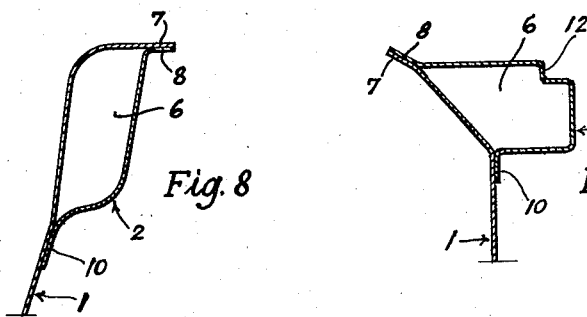
Fig. 8 is a fragmentary cross-sectional view taken along line VIII—VIII of Fig. 3.
Figure 9:
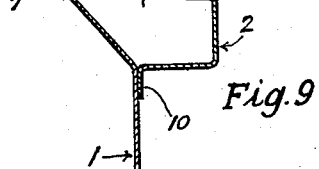
Fig. 9 is a fragmentary cross-sectional view taken along line IX—IX of Fig. 2.

Figs. 8 and 9 taken along line VIII—VIII of Fig. 3 and line IX—IX of Fig. 2 further show the formation of the box section 6 at the back top and vertical side portions of the seat frame structure.

It will now be seen from the foregoing, that the frame 2 and the co-fitting diaphragm 1 are so constructed as to form a 2-part seat frame possessing an entire encompassing box section along the periphery thereof when united.

Offsets 12, as seen best in Fig. 1 are provided at the lower corner sections of the frame 2. At the sides of the frame 2 all of the offsets 12 except the bottommost merge gradually into a flat surface 13 which continues around the bend of the frame 2 and vertically towards the top horizontal section of the frame 2. At the front face of the frame 2, as best seen in Fig. 5, the bottommost offsets 12 are separately terminated to provide an open space across the front of the seat frame 2, with the uppermost offset 12 continuing to form the offset 9 as shown in Fig. 7.

As will now be evident, while the provision of the offsets 12 is advisable for purposes of further reinforcing the sides of the box section 6 an important auxiliary purpose thereof is to provide styling for the portions of the frame 2 which are intended to be visible in the finally upholstered seat. By thus providing a patterned configuration for these portions of the frame 2, the practice, heretofore necessary, of providing side and front covering panels in the finished seat is eliminated. It will be understood that numerous other patterned configurations may be used and still be within the spirit of this invention. Since the material of construction, namely reinforced plastics, lends itself exceedingly well to manufacturing in various color hues, a colorful exterior can thus be presented heretofore unavailable without expensive auxiliary overlying panels adding materially to the cost, weight and structural complexity of the seat.

As best seen in Fig. 2, the overlying diaphragm 3 is affixed at the front edge thereof to the front edge of diaphragm lower portion 5. The rearward end of the diaphragm 3 is in line contact with the diaphragm 1 preferably in the general zone of transition between the upper portion 4 and the lower portion 5 of the diaphragm 1. While the diaphragm 3 may be in direct contact with the diaphragm 1, it has been found preferable to provide a buffer strip 14 of a material such as metal within the area of contact to prevent excessive squeaking and the like. If desired, the contacting edge of the diaphragm 3 may be formed to present a thickened portion or bead 15 at the point of contact.

In view of the downwardly curved profile of the diaphragm 3 and the oppositely curved profile of the lower portion 5 of the diaphragm 1, as an increasing load is applied to the upper surface of the diaphragm 3, an increasing resistance is effected by the coaction of the two diaphragms. Thus a further advantage of the invention can be seen in that the construction shown may be cushioned directly with foam rubber and thereby eliminate the use of conventional springs and the like heretofore necessary. The inherent flexibility of the arrangement shown permits, for example, the construction of a seat for vehicles which is placed at a minimum distance from the vehicle floor thus conserving headroom space which, especially in present-day automobiles, is at a premium. However, the smooth undersurface of this seat facilitates air flow therebeneath from under-the-seat heat and the like. Furthermore, the seat arrangement permits the use of lesser thickness of foam rubber cushioning and the use of reversible cushions.

Figure 10:
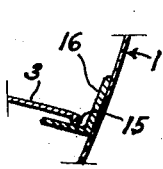
Fig. 10 is a fragmentary cross-sectional view taken along line X—X of Fig. 4.

Fig. 10 illustrates another form of buffer strip 16 which may be used in the place of the buffer strip 14 of Fig. 2. The buffer strip 16 is an L-shaped strip, preferably of metal, and placed to form a ledge or crotch wherein the bead 15 of the diaphragm 3 may rest.

Figure 11:
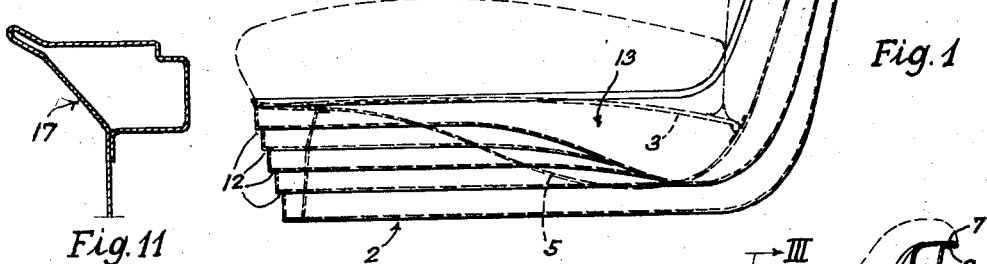
Fig. 11 is a fragmentary cross-sectional view of a modification of the seat frame construction of the invention.

Fig. 11 illustrates another modification of the invention. The supporting frame 2 and the diaphragm 1 of Fig. 1 are shown formed of a single sheet construction as shown by the sheet 17 of Fig. 11. While Fig. 11 shows only the cross-section of the vertical side edge portion of a seat, it will be obvious that similar cross-sections are present at the other peripheral edge portions of a seat constructed utilizing this modification to provide a seat frame structure of only two components; namely, the supporting structure sheet 17 of Fig. 11 and a diaphragm substantially as represented by the diaphragm 3 of Fig. 1.

To further illustrate the extremely compact and lightweight design which now becomes possible utilizing the seat frame construction of the invention, a typical front seat for an automobile, which was built and tested utilizing fiber-glass reinforced plastic throughout, had a frame constructed of 2 ply, 2 oz. mat, 0.070–0.100 in. thickness, a fixed diaphragm of 1 ply, 3 oz. mat. 0.050–0.070 inch thickness, and a top diaphragm of 2 ply, 3 oz. mat, 0.110 inch thickness. The entire weight of the seat frame structure was only approximately 25 pounds; a reduction in weight over a conventional steel frame structure of approximately 35%.

It will now be apparent that the objects of the invention have been achieved by a seat frame construction formed from a minimum number of components which are easily molded in manufacturing to facilitate the rapid assembly-line production of completed seat frames ready for upholstering. Furthermore, a major portion of the seat frame forms the finished seat surface and presents a patterned configuration enhancing the product appearance while at the same time providing structural reinforcement.

While certain representative embodiments and details have been shown for the purpose of illustrating the invention, it will be apparent to those skilled in this art that various changes and modifications may be made therein without departing from the spirit or scope of the invention.

We claim:

1. A seat including a frame, a diaphragm of relatively thin springy material having an inverted arc-shape in front to rear cross-section and a straight shape in longitudinal section cross-wise of the seat, means securing the front edge of the diaphragm to the front of the frame, and means slidably supporting the rear edge of the diaphragm on the back of the frame.

2. A seat frame structure of reinforced plastic including a first diaphragm of relatively thin springy material having a generally vertical upper portion forming the seat back and a concave upwardly curved lower portion forming the seat bottom and having the edges thereof inwardly curved to form a closed box section to reinforce and support the first diaphragm, a second diaphragm of relatively thin springy material generally overlying the concave lower portion of the first diaphragm and having a convex opposite curvature relative thereto and with the front edge of the second diaphragm contiguously overlying the front edge of the first diaphragm and the rear edge of the second diaphragm in substantially line contact with the transition zone between the upper and lower portions of the first diaphragm, and means rigidly affixing the front edge of the second diaphragm to the front edge of the first diaphragm.

3. A seat frame structure of reinforced plastic including a first diaphragm of a width substantially that of the seat and having a generally vertical upper portion forming the seat back and a concave upwardly curved lower portion forming the seat bottom, a supporting structure encompassing the edges of the first diaphragm, means rigidly attaching the edges of the first diaphragm to the supporting structure, a second diaphragm generally overlying the concave lower portion of the first diaphragm and having a convex opposite curvature relative thereto and with the front edge of the second diaphragm contiguously overlying the front edge of the first diaphragm and the rear edge of the second diaphragm being in sliding and wedging line contact with the transition zone between the upper and lower portions of the first diaphragm upon the application of load to the second diaphragm, and means rigidly affixing the front edge of the second diaphragm to the front edge of the first diaphragm.

4. A seat frame structure including a first diaphragm of reinforced plastic having a width substantially that of the seat and having a generally vertical upper portion forming the seat back and a concave upwardly curved lower portion forming the seat bottom, a supporting structure of reinforced plastic encompassing the edges of the first diaphragm, means rigidly attaching the edges of the first diaphragm to the supporting structure, a buffer strip extending substantially the width of the first diaphragm along the upper surface thereof within the transition zone between the upper and lower portions thereof, means affixing the buffer strip to the first diaphragm, a second diaphragm of reinforced plastic generally overlying the concave lower portion of the first diaphragm and having a convex opposite curvature relative thereto and with the front edge of the second diaphragm contiguously overlying the front edge of the first diaphragm and the rear edge of the second diaphragm in sliding and wedging line contact with the buffer strip upon application of load to the second diaphragm, and means rigidly affixing the front edge of the second diaphragm to the front edge of the first diaphragm.

5. A seat frame structure including a first diaphragm of reinforced plastic having a width substantially that of the seat and having a generally vertical upper portion forming the seat back and a concave upwardly curved lower portion forming the seat bottom, a supporting structure of reinforced plastic encompassing the edges of the first diaphragm, means rigidly attaching the edges of the first diaphragm to the supporting structure, an L-shaped buffer strip extending substantially the width of the first diaphragm with one leg of the L overlying the upper surface thereof within the transition zone between the upper and lower portions thereof and the other leg of the L projecting outwardly of said surface, means affixing the buffer strip to the first diaphragm, a second diaphragm of reinforced plastic generally overlying the concave lower portion of the first diaphragm and having a convex opposite curvature relative thereto and with the front edge of the second diaphragm contiguously overlying the front edge of the first diaphragm and the rear edge of the second diaphragm resting within the crotch of the L-shaped buffer strip, and means rigidly affixing the front edge of the second diaphragm to the front edge of the first diaphragm.

6. A seat frame structure of reinforced plastic including a first diaphragm of a width substantially that of the seat and having a generally vertical upper portion forming the seat back and a concave upwardly curved lower portion forming the seat bottom, a shaped frame encompassing the edges of the first diaphragm and arranged with relation to the edge portions to form a closed box section therebetween to reinforce and support the first diaphragm, means rigidly attaching the edges of the first diaphragm to the shaped frame, a second diaphragm generally overlying the concave lower portion of the first diaphragm and having a convex opposite curvature relative thereto and with the front edge of the second diaphragm contiguously overlying the front edge of the first diaphragm and the rear edge of the second diaphragm in sliding substantially line contact with the transition zone between the upper and lower portions of the first diaphragm, and means rigidly affixing the front edge only of the second diaphragm to the first diaphragm along the front edge of the first diaphragm.

7. A seat including an endless peripheral channel frame of reinforced plastic sheet for both the back and bottom of the seat, a one-piece diaphragm of reinforced plastic sheet having an approximate J-shape in cross-section with the edges thereof contiguously overlying the channel frame, and means securing the edges of the diaphragm to the channel frame so that the diaphragm edge portions bridge the legs of the channel to make a box girder of the channel frame.

References Cited in the file of this patent
UNITED STATES PATENTS

| | | |
|---|---|---|
| D. 142,800 | Watson | Nov. 6, 1945 |
| 2,081,791 | Bromagem | May 25, 1937 |
| 2,135,657 | Church | Nov. 8, 1938 |
| 2,711,786 | Weiss | June 28, 1955 |